Sept. 26, 1961     E. T. PRICE ET AL     3,001,274
BRAZING ARTICLE AND METHOD
Filed Jan. 18, 1957
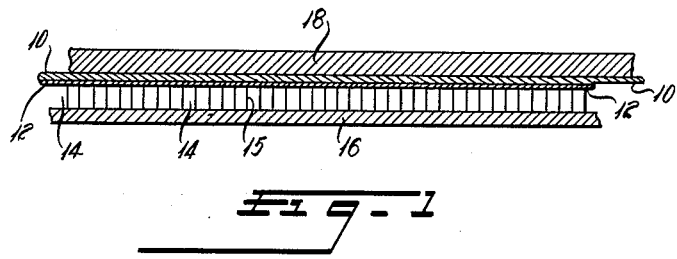
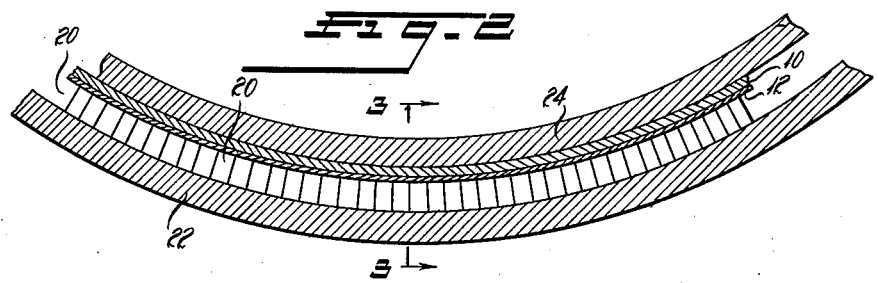
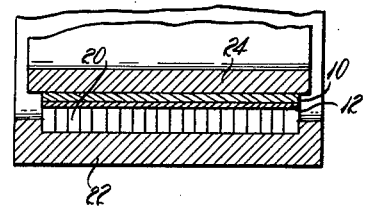
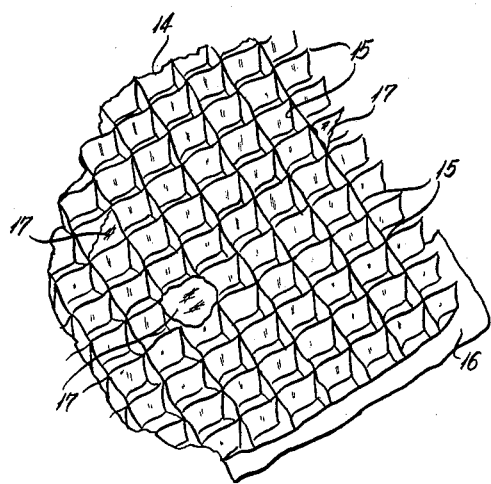
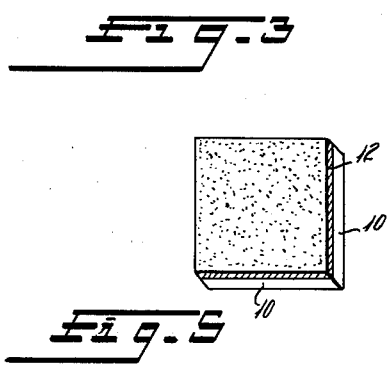
INVENTORS
EDMUND T. PRICE
JAMES R. WOODWARD
RICHARD M. MESSER
BY
ATTORNEYS

United States Patent Office 3,001,274
Patented Sept. 26, 1961

3,001,274
BRAZING ARTICLE AND METHOD
Edmund T. Price, James R. Woodward, and Richard M. Messer, San Diego, Calif., assignors to Solar Aircraft Company, San Diego, Calif., a corporation of California
Filed Jan. 18, 1957, Ser. No. 634,988
8 Claims. (Cl. 29—455)

This invention relates to a novel brazing article and method of using the same. It is particularly suited for brazing metal cellular type structures such as honeycomb to a metal face skin or the like in making so called open face honeycomb sandwiches or like structures.

Metal cellular structures (which for convenience will be referred to hereinafter as honeycomb) brazed to a face skin or other metallic member like a shaft, casing, flange, or the like, have found many uses, as in seals or rub rings and acoustical insulation, and particularly where light weight is a prime consideration.

In making open face honeycomb sandwiches prior to the present invention, it has been the practice to position the honeycomb structure on a face skin or a member to which the honeycomb is to be joined and hold the honeycomb in position on said member by means of clamps, clips, or the like. A small amount of brazing material, usually in powder form, is applied by hand loading to a node of each cell in the honeycomb structure, and then held in position by spraying with a binder such as a plastic cement dissolved in a suitable solvent. The open side of the honeycomb is then covered by a thickness of some separating or stop-off material like asbestos, and clamped in an appropriate jig or like holding means to hold the core edges and face sheet in close and continuous contact. The assembly is then furnace fired to cause the brazing material to melt and flow by capillary action along the nodes to the joints between the cells of the honeycomb and the metal surface to which the honeycomb is being joined.

The application of the brazing material to the individual core cells in the honeycomb structure by hand loading is a precise and time consuming operation. It is necessary that the worker provide sufficient brazing material for each cell to assure complete bonding of the honeycomb structure to the member to which it is being joined. Yet, the worker must be careful not to apply too much brazing material, or exaggerated fillets and unnecessary weight of the finished product will result.

This invention has several purposes. It assures that assembled structures including thin-walled honeycomb cores brazed to a face or backing sheet will have all joined edges and surfaces properly bonded by continuous braze joints. It also eliminates the time consuming hand loading of braze material in honeycomb cell nodes. This is accomplished by a novel method utilizing a novel separating or stop-off sheet of inert material bearing the braze alloy, which is interposed between the open face side of the honeycomb core and the pressure clamping means for the brazing assembly as hereinafter explained.

Accordingly, it is a primary object of this invention to provide a novel method of brazing a metal cellular type structure like honeycomb to a metal surface like a face skin by means of a novel sheet of heat-resistant material having a brazing material adhering to a surface thereof, wherein the sheet is used to separate the open face cell edges of the cellular core structure from a clamping jig member during brazing to prevent the jig member from uniting with the core during the brazing operation, and provides the correct amount of brazing material to all contacting parts to produce even continuous braze fillets bonding the core cell edges and metal surface. It is a related object to provide such a novel means and method which eliminate the tedious time consuming and costly manual application of precise amounts of braze powder to the individual honeycomb core cells.

Another object of this invention resides in providing a novel article of manufacture for applying brazing materials to cellular structures to be joined to the surfaces of other members, the article comprising a separating or stop-off sheet of asbestos or like heat-resistant material having the requisite amount of brazing material adhering to a surface thereof as by means of a coating of adhesive binder material.

It is still another object of this invention to provide a brazing method utilizing such a novel separating or stop-off sheet carrying a predetermined thickness of brazing alloy powder retained by an adhesive compound which volatilizes freeing the braze powder so that it will melt and flow by capillary action down the nodes of the core and form bonding fillets between the core edge and mating face skin or like member. It is related to provide an efficient practical method of making such stop-off sheets bearing desired quantities of braze alloy, flux, and binder.

Other objects and advantages of the invention will be apparent from the following detailed description and accompanying drawing, in which:

FIGURE 1 is a schematic vertical section view of a typical assembly utilizing the invention ready for furnace firing, with certain elements exaggerated for clearness;

FIGURE 2 is a schematic section view of a portion of an assembly utilizing the invention for brazing a honeycomb ring structure to a turbine shroud and seal ring, with certain elements exaggerated for clearness;

FIGURE 3 is a section taken on line 3—3 of FIGURE 2, illustrating the recessed shroud ring for receiving the honeycomb sealing structure;

FIGURE 4 is a perspective view of a flat honeycomb type structure brazed to a face sheet, with charred particles of the inert backup sheet which carried the braze material still clinging to the cell wall edges; and FIGURE 5 is a perspective view of a sheet of heat-resistant material, greatly exaggerated in cross-section, having a brazing material adhering to a surface thereof by means of a coating binder material.

As above discussed, it has heretofore been the custom to hand load the cellular core with braze alloy. It has also been the practice to use a sheet of asbestos or like material to act as a "stop off" between the open face of the core and the necessary cooperating part of the jig or fixture used to clamp the cellular core and skin together to preclude the tendency of the braze material to flow to the open face of the core and braze it to the cooperating part of the jig. It is necessary in brazing a honeycomb core and a face sheet that the core cell edges and skin (face sheet) be in close and continuous contact during the brazing process. The melted braze material flows to all joints through capillary action, and a gap of as little as .005 inch would act as a "stop off" and halt the flow of braze material. Therefore, it has been found essential to put the work piece in a jig, clamp, or other fixture, not primarily to hold the asbestos to the cellular core, but to hold the core to the face sheet in continuous contact.

This invention lies in the use of the necessary asbestos or the like sheet in the triple role of (1) precluding a bonding of the cellular core to the jig during brazing, and (2) providing just the right amount of braze material to the right place while (3) distributing jig or clamping pressure on the core, with the flexibility of the asbestos or like sheet compensating for local variations in core thickness to maintain good contact between the core edges and the skin or other metal surface to which it is brazed. When the assembly is subjected to furnace temperature, the braze material melts and flows by capillary action along the nodes of the core to the junctions of core and skin, thus bonding core and skin. While, as shown in FIGURE 4, discussed below, the asbestos material in large part is destroyed during the brazing cycle, it remains adjacent the open cell edges and provides the necessary "stop off" gap to maintain pressure on the work piece, so the fixture is not brazed to the open face of the cellular core, and desired continuous brazed joints between cell edges and the face sheet are realized. Whenever in this specification or claims the phrase "heat resisting" or "heat resistant" material is used it means a material which has physical characteristics of heat resistance, flexibility and inertness to brazing alloys similar to that of asbestos at least at brazing temperatures.

In practicing this invention, a surface of a sheet 10 of suitable heat-resistant material, such as asbestos, is provided with a coating 12 as in FIGURE 5 comprising a suitable dispersed, powdered braze alloy (for example, the braze alloy disclosed in copending United States patent application Serial No. 460,506, filed October 5, 1954, issued on October 14, 1958 as Patent No. 2,856,281). The amount of braze alloy material may be varied as desired, depending upon the size and number of joints to be brazed. Also, the amount of brazing material placed on some portion(s) of the sheet may vary from the amount placed on other areas of the same sheet. For example, in cellular honeycomb core structures in which there are portions of core area with a greater cell density than in other areas, the amount of braze material may be increased on corresponding areas of the heat-resistant sheet, to provide an adequate amount of braze material for correct brazing.

Any number of ways may be used to distribute and retain the brazing material on a surface of the heat-resistant material. For example, a powdered brazing material may be spread or dispersed over a surface of the heat-resistant material and then a binder sprayed over this surface to hold the brazing material on the heat-resistant material. The brazing material might also be made to adhere to the heat-resistant material by imbedding the powdered material into a sheet of the heat-resistant material for example, by means of a steel roller.

It is desirable, but not necessary, to incorporate in the heat-resistant sheet a flux material such as sodium carbonate, zinc chloride, sodium pyroborate, borax, or the like. As is well known, flux materials increase the fluidity of brazing materials and bring them into more intimate contact with the members to be joined. A method of applying the flux material is by mixing with the binder before the binder is sprayed upon the surface of the heat-resistant sheet.

A preferred efficient method of making the novel integral backup sheets is as follows: A desired amount of powdered brazing alloy is spread over a protective inert sheet of material like asbestos. Next, an inhibitor or flux in a binder-vehicle (discussed infra) is sprayed over the braze powder, at a low pressure of about 5 p.s.i.g., to set the film without blowing the powder out of place. Then the thus-coated sheet is again sprayed with more of the binder-vehicle at a higher pressure of about 20 p.s.i.g. to assure that the adhesive material soaks into the surface of the asbestos sheet.

Any adhesive-like material which volatilizes at brazing temperatures and does not contaminate the brazing material may be used as a binder to hold the brazing material to the heat-resistant sheet. Examples of such binders are acrylic resins, or dilute polystyrene-methyl chloride solutions. These materials dry almost instantly when sprayed upon a surface and provide good adherence for the brazing material to the heat-resistant sheet.

A most satisfactory heat-resistant sheet has been found to be a thin sheet of asbestos which is non-contaminating to the usual brazing materials; for example, 8 mil "Quinterra," a pressed sheet manufactured by Johns-Manville Company. This material will maintain a protective space between the face of the honeycomb structure which is to remain open in the final assembly, and will also retain its mass characteristics to maintain jig or clamp pressure for holding the cellular core to the face sheet.

Referring now to FIGURE 1 of the drawing, there is shown a sheet of heat-resistant material 10 having a coating 12 on the surface thereof contiguous to and in intimate contact with the edges of a metal honeycomb type structure 14. The coating 12 is made up of a dispersed brazing alloy, with a flux if desired, which are held to the heat-resistant sheet 10 by a suitable binder, as above-described. The honeycomb 14 is to be joined to a face skin 16. A mandrel 18 is disposed on sheet 10 to provide a uniform pressure through sheet 10 to maintain the edges of the honeycomb cell in continuous contact with the surface of the face skin 16 so that the brazing material will be assured of flowing, by capillary action, to effect a complete distribution between the edges of honeycomb core 14 and face skin 16. This assembly is placed in a furnace and subjected to a temperature sufficiently high to cause the brazing alloy to flow. During firing, the binder film on the backup sheet volatilizes and the braze alloy melts and flows by capillary action down nodes 15 of the honeycomb structure 14 and forms a uniform continuous brazed bond between the edges of the honeycomb cells and face skin 16 and also at the node joints 15. This uniform distribution of brazing material provides a strong cohesive bond with uniform braze fillets at all joints and no undesirable aggregates or heavy deposits of brazing material, so that a strong finished product without unnecessary weight is obtained.

During the brazing operation, sheet 10 provides the aforementioned protective barrier between the brazing material and the mandrel 18 so that no brazing material may form a bond between the mandrel and the honeycomb structure 14.

Some heat-resistant materials may be completely charred during the brazing operation but so long as they provide a protective barrier sufficient to prevent capillary flowing of brazing material to the mandrel, good results are obtained.

When the brazing operation is completed, the mandrel 18 is removed from the assembly. The heat-resistant sheet 10 is easily removed from the honeycomb structure 14, although some charred residue may be left as illustrated at 17 in FIGURE 4. The charred residue may be easily removed by brushing or by blowing with an air hose.

In FIGURE 2 there is shown a section of a turbine blade shroud ring seal. A honeycomb core 20 forms a labyrinth type seal between turbine rotor blades (not shown) and the seal casing or shroud ring 22. In this illustration, the seal casing 22 may be fabricated from arcuate sections which subsequently will be fitted into matching grooves in a turbine casing, or it may constitute the integral turbine casing itself. It is to be understood that the curvatures of mandrel 24, casing 22 and honeycomb 20 are suitably chosen for a matched brazing assembly.

It is clearly evident from the foregoing disclosure that this invention provides a novel braze method utilizing a novel relatively inexpensive braze-carrying backup sheet enabling uniform application of brazing material between a metal honeycomb and adjoining metal surfaces, which results in high strength, low weight end products; and that this new method of brazing honeycomb cell structure to other structure results in a considerable savings of time over the previous methods involving manual application of braze material to individual cells of the honeycomb.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing descrip-

What is claimed and desired to be secured by United States Letters Patent is:

1. In a method of joining a metal cellular type honeycomb structure to a metal surface by brazing, the steps comprising: positioning on a metal surface the cell edges of one side of the honeycomb structure to be joined to the metal surface; placing a sheet of heat-resisting material, having a predetermined thickness of brazing compound in sufficient amount to form bonding fillets between the honeycomb and said metal surface retained on one side of said sheet by an adhesive, with said latter side of the sheet on the opposite cell edges of the honeycomb; applying pressure to the other side of said sheet of heat-resisting material so that the cell edges of the honeycomb structure are maintained in substantially continuous line contact with the metal surface; and heating the assembly to a temperature sufficient to volatilize the adhesive and melt the thus-freed braze compound causing it to flow by capillary action down the nodes of the honeycomb and form bonding fillets between the honeycomb structure and said metal surface.

2. In a method of joining a metal cellular type structure to a metal surface by brazing, the steps comprising: positioning on a metal surface the cell edges of one side of the cellular structure to be joined to the metal surface; placing a sheet of heat-resisting material, having a predetermined thickness of brazing compound in sufficient amount to form bonding fillets between the edges of the cellular structure and said metal surface retained on one side of said sheet, with said side of the sheet on the cell edges on the opposite side of the cellular structure; applying pressure to maintain the cell edges of the cellular structure on said one side in substantially continuous line contact with the metal surface; and heating the assembly to a temperature sufficient to melt the braze compound freeing it from said sheet and causing it to flow by capillary action along the nodes of the cellular structure to said one side of the cellular structure and to form bonding fillets between the edges of the cellular structure and said metal surface.

3. An article of manufacture comprising: a flexible and deformable sheet of heat-resisting material, and a coating of a binder and a predetermined amount of brazing material in particle form retained on a surface of said sheet by said binder, said binder being an adhesive-like material which volatilizes at least at the melting temperature of the brazing material, and said heat-resisting material being a temporary expendable carrier for and non-contaminating to the brazing material.

4. An article of manufacture as defined in claim 3, wherein said coating on said sheet surface also contains a flux material.

5. An article of manufacture as defined in claim 3, wherein said heat-resisting material is asbestos.

6. An article of manufacture as defined in claim 3, wherein said binder is a resinous material.

7. An article of manufacture as defined in claim 6, wherein said binder is an acrylic resin.

8. For use in a method of brazing one side of a metal cellular type structure to a metal surface, an article of manufacture comprising: a flexible and deformable sheet of heat-resisting material having a surface area at least as large as the area of said side of the cellular type structure and a coating of a binder and a predetermined amount of brazing material in particle form retained on a surface of said sheet covering an area at least coextensive with the area of said side of the cellular type structure, said binder being an adhesive-like material which retains the brazing particles on said sheet surface and which volatilizes at least at brazing temperatures, and said heat-resisting material being a temporary expendable carrier for and non-contaminating to the brazing material.

References Cited in the file of this patent

UNITED STATES PATENTS

| | | |
|---|---|---|
| 405,866 | Bayles | June 25, 1889 |
| 1,406,538 | Choate | Feb. 14, 1922 |
| 2,391,997 | Noble | Jan. 1, 1946 |
| 2,614,517 | Peterson | Oct. 21, 1952 |
| 2,688,579 | Meyer | Sept. 7, 1954 |
| 2,724,177 | Coffman et al. | Nov. 22, 1955 |
| 2,745,368 | Klein | May 15, 1956 |
| 2,815,729 | Goodman | Dec. 10, 1957 |
| 2,816,355 | Herman | Dec. 17, 1957 |
| 2,900,713 | Young | Aug. 25, 1959 |